No. 731,537. PATENTED JUNE 23, 1903.
C. BORNMANN.
CAMERA.
APPLICATION FILED MAR. 7, 1903.
NO MODEL.
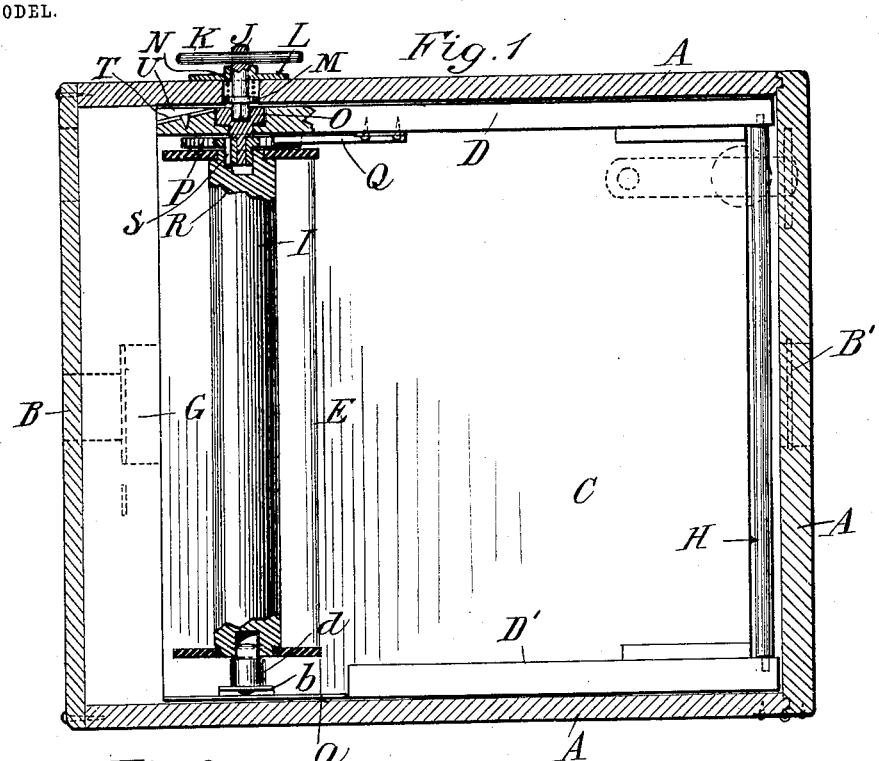
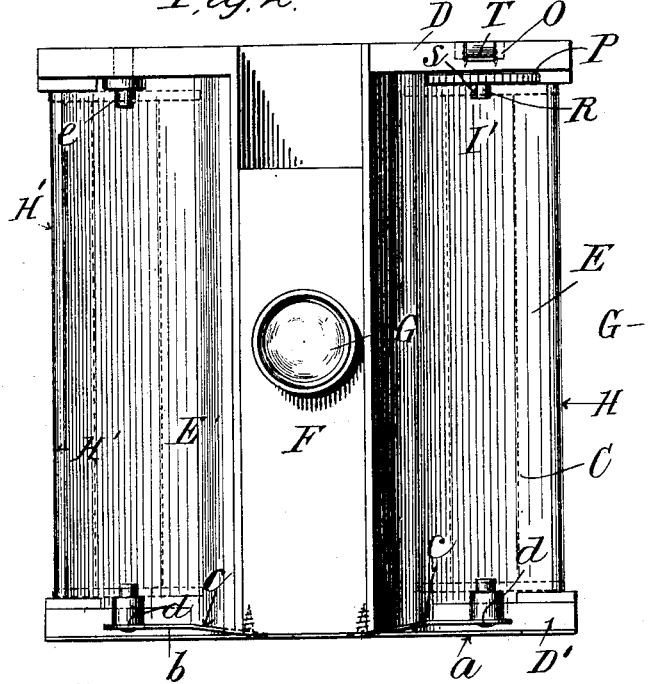
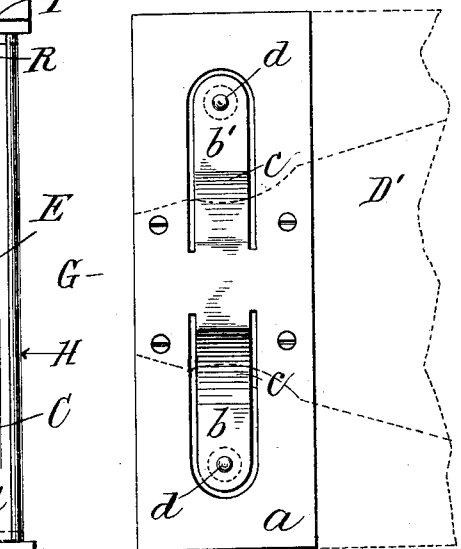
Witnesses
Edward Rowland
K. M. Dmitrieh
Inventor
Carl Bornmann
By his Attorney
Phillips Abbott No. 731,537.

Patented June 23, 1903.

UNITED STATES PATENT OFFICE.

CARL BORNMANN, OF NEW HAVEN, CONNECTICUT, ASSIGNOR TO THE ANTHONY & SCOVILL COMPANY, OF NEW YORK, N. Y., A CORPORATION.

CAMERA.

SPECIFICATION forming part of Letters Patent No. 731,537, dated June 23, 1903.

Application filed March 7, 1903. Serial No. 146,793. (No model.)

*To all whom it may concern:*

Be it known that I, CARL BORNMANN, a citizen of the United States, and a resident of the city of New Haven, county of New Haven, State of Connecticut, have invented new and useful Improvements in Cameras, of which the following is a specification, reference being had to the accompanying drawings, in which—

Figure 1 illustrates a longitudinal vertical section of the invention. Fig. 2 illustrates a view in elevation of the interior frame carrying most of the operative parts and showing the construction of the metallic plate and spring-acting spool-supports cut therefrom. Fig. 3 illustrates a view of the plate and spring-acting spool-supports cut therefrom, taken from below.

My improvements relate to that form of camera in which there is an interior frame removable from the exterior box or camera proper and which supports and carries the supply and receiving spools which support the film.

More particularly specified, the improvements relate to devices whereby the interior frame may be readily inserted and locked within the exterior box of the camera proper and easily removed therefrom for the removal and insertion of spools and when removed the spools are exposed on all sides except one, whereby they may be more conveniently manipulated than heretofore.

The invention also includes improved devices for receiving and holding the spools when the interior frame is removed, and the construction is such that the lens is carried by the removable frame, so that it is withdrawn from the camera-box with the frame and may be more easily and efficiently cleaned than heretofore.

Referring to the drawings, A illustrates the exterior box or casing of the camera proper. It may be made in any of the various forms now commonly employed.

B is the lens-opening in the interior box or casing proper of the camera, through which light passes to the lens. A suitable diaphragm and shutter are provided for this opening, as usual.

B' is the usual peep-hole, protected by ruby-glass or its equivalent, in the hinged rear end of the camera-box.

C is the interior frame. It is made with top and bottom pieces D and D', respectively, which are preferably square in outline, as usual, with two inclined sides pieces E and E' and a front piece or narrow vertical strip F, within which the lens G is located, as usual. At the rear corners of the side pieces E and E' are located the usual guide-rollers H and H'.

I and I' are the two spools, which, as shown, are not inclosed in any box or confining device. On the contrary, when the frame is removed from the camera-box they are accessible from all sides except that on which the inclined side pieces or partitions E and E' are located.

J is the ordinary spindle for the winding-spool, having a squared lower end. K is the cross-bar thereof.

L is a plate fastened to the outside of the camera-box, through which the spindle J passes.

M is the collar of the spindle, and N is the spring between the collar and the plate L, which normally tends to press the spindle inwardly.

O is a circular and revoluble metallic block or journal set in a circular recess in the top board D of the interior frame. It has a square recess in its upper side to fit the end of the spindle K and is connected with a ratchet-pinion P, with which engages a fixed pawl Q. The inward terminal R of the spindle projects so as to enter a recess in the end of the spool, and it is provided with pins S, (one only being shown in the drawings, owing to the perspective of the view,) so as to effect the rotation of the spool in a manner well understood.

T is a little metallic plate, which is fastened in any suitable manner in an inclined recess U, made in the upper board D of the interior frame. The upper end of this metallic plate is flush with the top of the metallic block O.

Fastened on the under side of the interior frame and in such position as to properly register with the other parts to form a support for the spools is a metallic plate $a$, from which are cut two tongues or arms $b\ b'$, which are thrown upwardly, as shown, by the rising section $c$ thereof. (See Fig. 2.) Near the ends of these spring-tongues are rigidly attached studs $d\ d$, which are adapted to engage with recesses in the lower ends of the spools, respectively.

$e$ is a trunnion or center, upon which the supply-spool is pivoted at the upper end, as usual.

The operation of the apparatus is as follows: Assume that the camera has been used to such an extent that the film within it has been exhausted and it is desired to replace the used film with an unexposed one. The door at the rear end of the camera-box proper is opened, as usual, either by unfastening its latch and swinging it aside upon its hinges or by disconnecting it from the camera, as its construction may require. Thereupon the operator takes hold of the winding-spindle J K and lifts it upwardly, compressing the spring N, whereby the inner squared end or terminal of the spindle will be lifted from the correspondingly-shaped recess in the block O. Thus the interior frame will be free from locking engagement with the camera-box proper and may be pulled rearwardly out through the open door and separated from the camera. Thereupon the used spool may be removed by taking hold of it and pressing downwardly thereon, which compresses the spring $c$ at the left-hand side of the interior frame, as shown in Fig. 2, thus disengaging the upper journal $e$ from the upper end of the spindle, whereupon it may be swung outwardly and removed from the frame. By a reversal of these operations a new full spool may be substituted for the exhausted one removed, as above stated.

It will be noted that when the frame has been removed from the camera-box the spools are more openly exposed for manipulation than in cameras heretofore made; also, that the spring tongues or arms $b\ b'$ not only afford proper support for the spools and enable them to be readily removed when substitution is necessary, but also that owing to the resilient character of these arms or tongues they maintain the spools under a condition of slight compression, (the degree of compression may be such as desired,) whereby all lost motion is taken up and any rattling of the parts of the apparatus is avoided; furthermore, that the plate $a$ serves as a brace or reinforcing medium for the front of the interior frame, thus materially strengthening it, and the arms of this plate $a$ coacting with the spring-sustained spindle J K afford, taken together, means whereby the spools may be held and manipulated and the frame which carries them inserted within and removed from the camera-box proper in a peculiarly desirable manner.

To reinsert the removable frame, the rear door of the camera being of course open the frame is introduced and shoved in from the rear forwardly. It is not necessary to manually manipulate the spindle J upon the reinsertion of the removable frame, because during that operation it is entirely automatic in action. As the removable frame approaches its proper position within the camera-box proper the inwardly-projecting squared end of the spindle engages with the inclined plate T, located within the recess U, and the inward movement of the frame being continued the spindle rides upon the inclined plate T until finally the end of the spindle, leaving the inclined plate, rides over the surface of the metallic block O until the end of the spindle registers with the recess in that block, and thereupon under the action of the spring N it drops into the said recess, and the interior frame is locked in position and the spindle automatically connected with the journal of the winding-spool, whereby it may be turned.

It will be obvious to those who are familiar with this art that modifications may be made in the details of construction of the parts involved without departing from the essentials of my improvements. I therefore do not limit myself to the details of construction which I have described and illustrated merely as one form, and a desirable form, in which my improvements may be made.

I claim—

1. In a camera the combination of a removable spool-carrying inner frame provided with ratchet mechanism for the winding-spool, a spring-actuated winding device which automatically engages with the ratchet mechanism on the insertion of the removable frame within the camera and a spring-actuated support for the lower end of said spool.

2. In a camera the combination of a removable spool-carrying inner frame provided with ratchet mechanism for the winding-spool, a spring-actuated winding device which automatically engages with the ratchet mechanism on the insertion of the removable frame within the camera and locks said frame therein and a spring-actuated support for the lower end of the spool.

3. In a camera the combination of a removable spool-carrying inner frame, a spring-actuated winding device adapted to engage with the removable frame and lock the same within the camera.

4. In a camera the combination of a removable spool-carrying inner frame a spring-actuated winding device carried by the camera proper and means upon the removable frame whereby upon its insertion within the camera the winding devices will automatically engage therewith.

5. In a camera the combination of a removable inner spool-carrying frame, a metallic plate attached to said frame, and removable therewith, journals for the upper ends of the spools, means to rotate the winding-spool and upwardly-curved elastic tongues cut from the said metallic plate and journals for the lower ends of the spools mounted upon said elastic tongues.

In testimony whereof I have signed my name to this specification in the presence of two subscribing witnesses.

CARL BORNMANN.

Witnesses:
JOHN ELLIOTT,
M. E. HARKIN.